(12) United States Patent
Okada et al.

(10) Patent No.: US 6,935,563 B2
(45) Date of Patent: Aug. 30, 2005

(54) CODE READER

(75) Inventors: Tohru Okada, Aichi-gun (JP); Toshiharu Kawashima, Nishikasugai-gun (JP)

(73) Assignee: Aisin Engineering Co., Ltd., Kariya (JP)

( * ) Notice: Subject to any disclaimer, the term of this patent is extended or adjusted under 35 U.S.C. 154(b) by 68 days.

(21) Appl. No.: 10/406,503

(22) Filed: Apr. 4, 2003

(65) Prior Publication Data

US 2003/0226893 A1 Dec. 11, 2003

(30) Foreign Application Priority Data

Apr. 4, 2002 (JP) ....................................... 2002-137799

(51) Int. Cl.[7] ................................................ G06K 7/10
(52) U.S. Cl. ................................... 235/454; 235/462.25
(58) Field of Search ................................. 235/454, 455, 235/462.01–462.49

(56) References Cited

U.S. PATENT DOCUMENTS

| | | | |
|---|---|---|---|
| 4,794,238 A | 12/1988 | Hampton | |
| 5,298,727 A | 3/1994 | Spratte et al. | |
| 5,461,417 A | 10/1995 | White et al. | |
| 5,589,678 A | * 12/1996 | Atsumi et al. | ......... 235/462.42 |
| 5,756,981 A | * 5/1998 | Roustaei et al. | ....... 235/462.42 |
| 5,767,501 A | * 6/1998 | Schmidt et al. | ......... 235/462.45 |
| 5,815,222 A | * 9/1998 | Matsuda et al. | ................ 349/1 |
| 6,155,490 A | * 12/2000 | Ackley | ................... 235/472.01 |
| 6,189,795 B1 | * 2/2001 | Ohkawa et al. | ........ 235/462.39 |
| 6,273,336 B1 | * 8/2001 | Rudeen et al. | ......... 235/462.24 |

FOREIGN PATENT DOCUMENTS

| | | | |
|---|---|---|---|
| JP | 355129871 A | * | 10/1980 |
| JP | 359128674 A | * | 7/1984 |
| JP | 2767412 | | 4/1998 |
| JP | 2000-298698 A | | 10/2000 |
| JP | 2001-307012 A | | 11/2001 |

OTHER PUBLICATIONS

U.S. Appl. No. 10/406,503, filed Apr. 4, 2003, Okada et al.
U.S. Appl. No. 10/447,947, filed May 30, 2003, Okada et al.
U.S. Appl. No. 10/447,994, filed May 30, 2003, Okada.

* cited by examiner

Primary Examiner—Thien M Le
Assistant Examiner—Kimberly D. Nguyen
(74) Attorney, Agent, or Firm—Oblon, Spivak, McClelland, Maier & Neustadt, P.C.

(57) ABSTRACT

A code reader is configured to reads information unique to an object from a code (e.g., one dimensional code, two dimensional code, three dimensional code, or multi-dimensional code combined with different codes, hereinafter referred to as a code) by providing the code directly or indirectly on the object in order to identify the particular object (e.g., a product) among the plural objects made of metal, rubber, ceramic, and resin, or the like.

21 Claims, 13 Drawing Sheets

US 6,935,563 B2

CODE READER

This application is based on and claims priority under 35 U.S.C. §119 to Japanese Patent Application No. 2002-137799 filed on Apr. 4, 2002, the entire contents of which are incorporated herein by reference.

FIELD OF THE INVENTION

The present invention relates to a code reader. Specifically, the present invention pertains to an internal construction of a code reader for reading a unique or identical code (i.e., unique information such as one dimensional code, a two dimensional code, a three dimensional code, and a hybrid multi-dimensional code combining different codes that show the unique information for an object) based on a reflection wave formed by a reflection of irradiated light reflecting the unique code by irradiating the light from light source relative to the unique code provided on the object.

BACKGROUND OF THE INVENTION

In order to control particular objects (e.g., products), each object is provided with a unique code (e.g., a one dimensional code or two dimensional code showing the information identifying the product) for differentiating each product. By reading the unique code provided on the particular product with a code reader for comprehensively controlling the product.

A code reader is described in Japanese Patent Laid-Open Publication No. H07-3266. The code reader described in Japanese Patent Laid-Open Publication No. H07-3266 includes a lens, a sensor, and a light source provided in a main body case for reading a code. The known code reader further includes an aperture provided on a reading side of the lens for reading the code. A surface of incident light diaphragm has camouflaged color (i.e., the surface has a color that reflects like, for example, white or yellow) which enables the diffusion of the light and the light from the light source is irradiated to light entrance diaphragm.

Another code reader is described in Japanese Patent Laid-Open Publication No. H10-111905. With the code reader described in Japanese Patent Laid-Open Publication No. H10-111905, a light source is provided in a case, the light from the light source is irradiated to the code, and the reflected light from the code is read by a camera via an incidence diaphragm mechanism and a lens. This code reader further includes a semi-transparent mirror plate between the lens and a reading side. The semi-transparent mirror plate is provided with an inclination. The light source corresponds to a plane illuminant generating the diffused light. With the known code reader, the plane illuminant is positioned for irradiating the light to the semi-transparent mirror plate. According to the known code reader disclosed in Japanese Patent Laid-Open Publication No. H10-111905, the semi-transparent mirror plate is equipped on end portions of the case body and the light entrance diaphragm mechanism having the inclination (i.e., angle of gradient being 45 degrees).

Notwithstanding, the light irradiated from the light source is absorbed by the camouflaged colored incident diaphragm and thus fails to produce the diffused light with sufficient luminance with the known code reader disclosed in Japanese Patent Laid-Open Publication No. H07-3266 because the surface of the incidence stop has camouflaged color which enables the diffusion of the light and the light source is irradiated to the light entrance diaphragm. Accordingly, in case the diffused light irradiated to the code is insufficient, the sufficient reflective light cannot be incident to the sensor, and, as a result, the recognition accuracy of the code is declined. In this case, the light source with high luminance may be applied or the output of the light source may be increased in order to ensure sufficient luminance of the diffused light. However, with this construction, a drive circuit of the light source is complicated, plural light sources are required, or the precious light source has to be applied, all of which increase the manufacturing cost.

The code reader described in Japanese Patent Laid-Open Publication No. H07-73266 includes the following drawbacks. For example, in case a code is provided on a mirror surface, although the incidence diaphragm mechanism has the camouflaged color such as white, a light entrance hole (i.e., entrance pupil) to which the light of the incidence diaphragm mechanism irradiates is darker than surroundings of the camouflaged color portion.

Accordingly, the dark portion (referred as a "black point" hereinafter) of the light entrance hole appears on the code of the mirror surface when reading the code provided on the mirror surface, and the black point is recognized by the sensor. Thus, when the black point appears on the code provided on the object, the reading accuracy of the code reader is reduced due to the black point to deteriorate the code reading. Thus, with the code reader described in Japanese Patent Laid-Open Publication No. H07-73266, the code has to be read by adjusting the position of the code reader relative to the code so that the black point does not overlap the code. This deteriorates the operability of the code reader when reading the code.

On the other hand, the length from the incidence diaphragm mechanism to the reading side is elongated with the code reader described in Japanese Patent Laid-Open Publication No. H10-111905, because the semi-transparent mirror plate is provided between the light entrance diaphragm mechanism and the reading side and because the reading side is provided having closed inclination by 45 degrees for blocking the light entrance diaphragm mechanism (to prevent dust from entering the lens) in the lens in order for the light being incident from other directions. This increases the size of the code reader.

In addition, because the semi-transparent mirror plate is equipped having the gradient angel of 45 degrees, the reflectance and the transmittance of the light is varied when the angle of gradient is changed. This influences on the brightness of the light reflected by the semi-transparent mirror plate. The change of the brightness of the light influences the recognition rate of the code.

Further, because one end portion of the semi-transparent mirror plate is equipped on the end portion of the case body, for example, in case the user drops the code reader on the ground, the impact from hitting on the ground is easily transmitted to the semi-transparent mirror plate. The mirror plate is therefore vulnerable to damage.

A need thus exists for a small and strong code reader which enables to read the code provided on a mirror surface with good operability to create the diffusion light with low manufacturing cost.

SUMMARY OF THE INVENTION

In light of the foregoing, the present invention provides a code reader which includes a housing having a reading side for reading an identical code provided on an object, and a means for illuminating provided in the housing, an image capturing means provided in the means for capturing the identical code. The means for illuminating is configured to irradiate a light from the reading side to the identical code for reading the information of the identical code by a reflection light reflected by the identical code. The code reader may further include means for transmitting light provided between the image capturing means and the means for illuminating having mirrored surface characteristics on a surface thereof and a light transmittance on the other surface thereof. The means for transmitting light is provided opposing to the reading side.

According to another aspect of the present invention, a code reader includes a housing having a reading side for reading an identical code provided on an object, a means for illuminating provided in the housing, an image capturing means provided in the housing for capturing the identical code, and a incident light restriction means for restricting a light entering the image capturing means. The means for illuminating irradiating a light from the reading side to the identical code for reading a reflection light reflected by the identical code as the information of the identical code by the image capturing means via the incident light restriction means. The code reader further includes a means for transmitting light provided between the incident light restriction means and the means for illuminating having a mirror surface characteristics on one surface thereof and a light transmittance on the other surface thereof. The means for transmitting light is positioned opposite the reading side.

BRIEF DESCRIPTION OF THE DRAWINGS

The foregoing and additional features and characteristics of the present invention will become more apparent from the following detailed description considered with reference to the accompanying drawing figures, in which like reference numerals designate like elements.

DETAILED DESCRIPTION OF THE INVENTION

Figure 1:
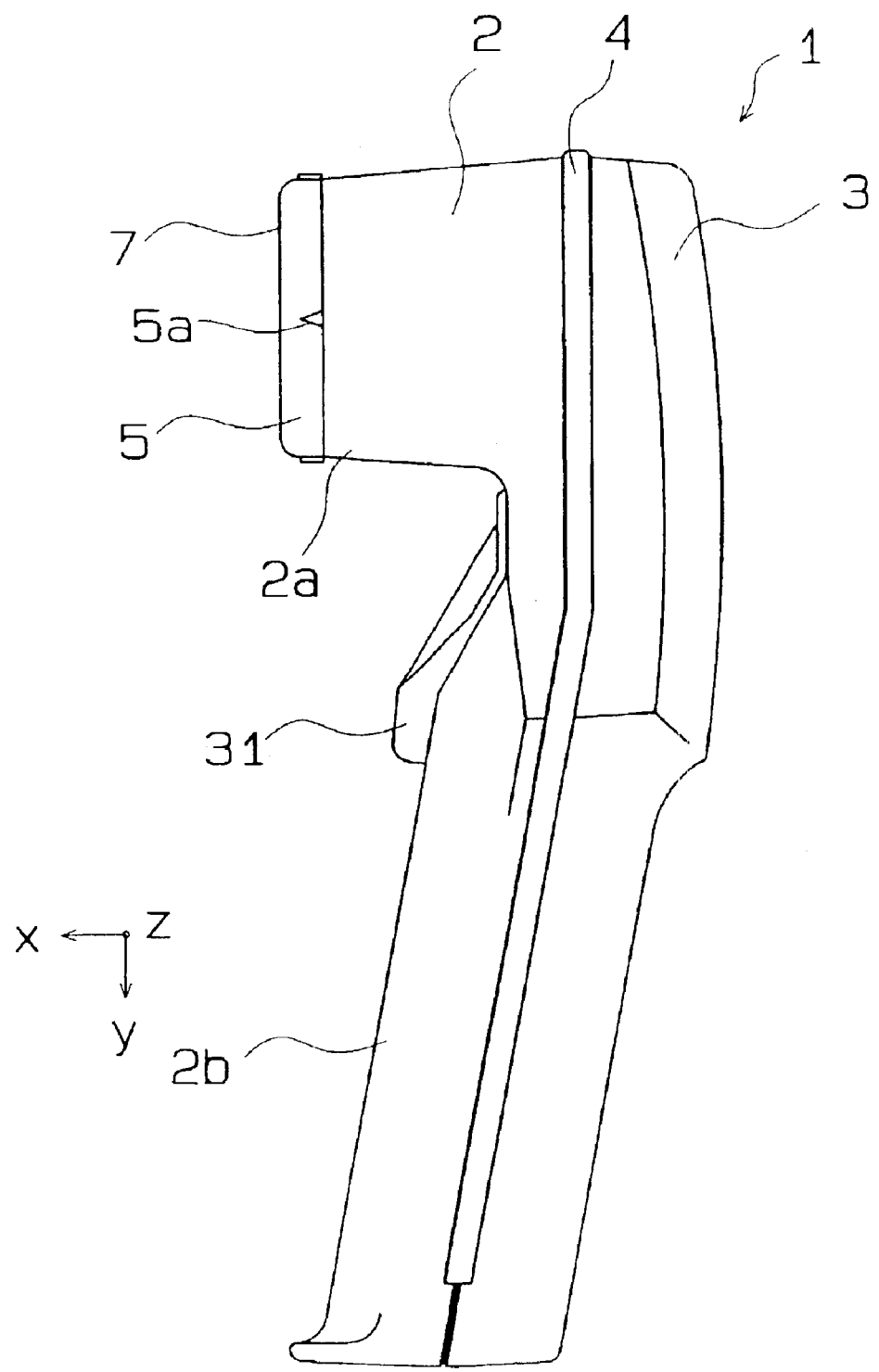
FIG. 1 is an outer view showing a configuration of a code reader according to a first embodiment of the present invention.

Embodiments of a code reader according to the present invention will be explained with reference to the illustrations of the drawing figures.

A first embodiment of a code reader 1 of the present invention will be explained referring to FIGS. 1–11. The code reader 1 is configured to read the information unique to an object 30 from a code 10 (e.g., one dimensional code, two dimensional code, three dimensional code, or multi-dimensional code combined with different codes, hereinafter referred to as a code) by providing the unique code 10 directly or indirectly on the object in order to identify the particular object (e.g., a product) 30 among the plural objects made of metal, rubber, ceramic, and resin, or the like. With the code reader according to this non-limiting embodiment, a two-dimensional code is applied and the code reader 1 for reading the information shown with the two-dimensional code will be explained.

The code is not limited to the two dimensional code, and members printed or inscribed with one dimensional code, three dimensional code, or multi-dimensional code represented as a barcode are applicable to a device for reading the code (i.e., more specifically, the information shown with the code) 10 by the reflective wave of the light reflected from the code 10 by irradiating the light from the inside of the code reader 1 to the particular portion having the unique code 10. Hereinafter, reading the unique information shown with the code 10 for the code 10 is referred as reading the code 10.

With the embodiments of the code reader, a light axis direction perpendicular to a CCD (charge coupled device) element included in a CCD camera 95 and lens group 91 is determined to be an X-axis direction. A direction perpendicular to the X-axis is determined to be a Y-axis direction, and a direction perpendicular to the X-axis and the Y-axis is determined to be a Z-axis direction. Further, a top of the code reader 1 shown in FIG. 1 is determined to be a top of the code reader, a bottom of FIG. 1 is determined to be a bottom of the code reader, and a right side of FIG. 1 is determined to be a back surface of the code reader.

As shown in the non-limiting illustration of FIG. 1, the code reader 1 includes a first housing 2 and a second housing 3 made of resin or the like. Non-limiting examples of a suitable material include ABS resin and urethane. The first housing 2 is formed with an opening on the back surface (i.e., right side of FIG. 1) and the opening is covered with the second housing 3 having a recessed configuration. The top of the reader of the first housing 2 is unitarily formed with a hood portion 2a having an approximately rectangular configuration projected in the X-direction. A grip portion 2b is formed to be extended slightly tilted from the Y-axis shown in FIG. 1 in the acute angle direction from the hood portion 2a of the first housing 2. The first and the second housings 2, 3 may be assembled for covering the openings formed respectively and may fixed each other with tightening members such as screws or the like.

The code reader 1 may be provided with an operation lever 31 rotating about the Z-axis. The operation lever 31 may be provided between the forward portion 2a and the grip portion 2b to be rotatable about a fulcrum 31b. The operation lever 31 is configured to activate the code reader 1 when the user holds the grip portion 2b and operates the operation lever 31 with, for example, the index finger or the middle finger to read the code 10.

When the first and the second housings 2, 3 are assembled to be fixed, a slip stopper 4 made of, for example, rubber or elastomer or the like may be provided, and may be configured to correspond to the opening configurations of the housings 2, 3. The slip stopper 4 is secured to the first and the second housings 2, 3 along the configuration of the opening end portions of the housings 2, 3 provided between the housings 2, 3. The slip stopper 4 prevents the slip of a hand from the grip portion 2b when the user operates the operation lever 31 of the code reader 1 for reading the code 10.

Figure 2:
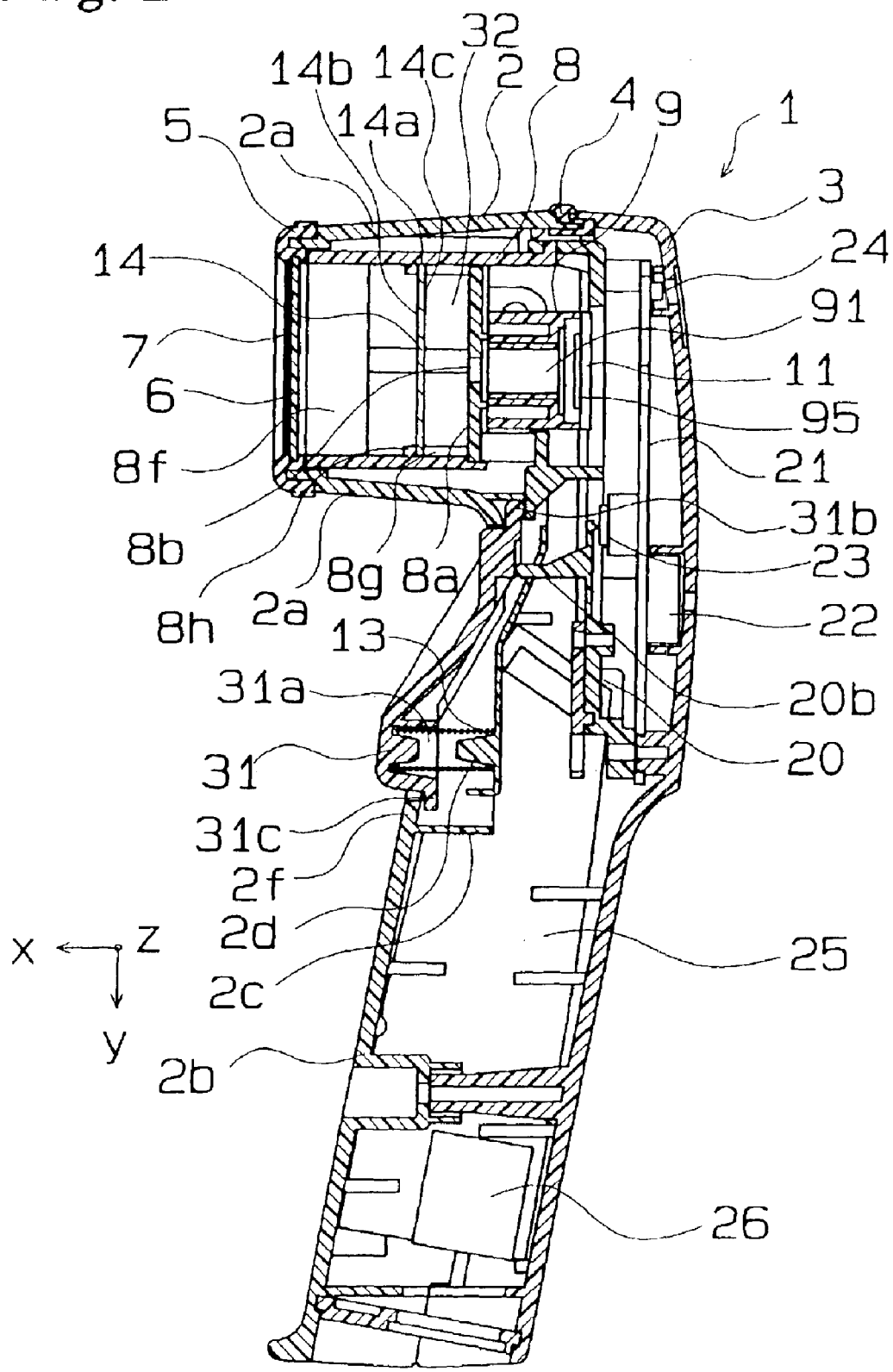
FIG. 2 is a cross-sectional view (i.e., cross-sectional view viewed from the right side) of the code reader in the y-direction shown in FIG. 1.
Figure 3:
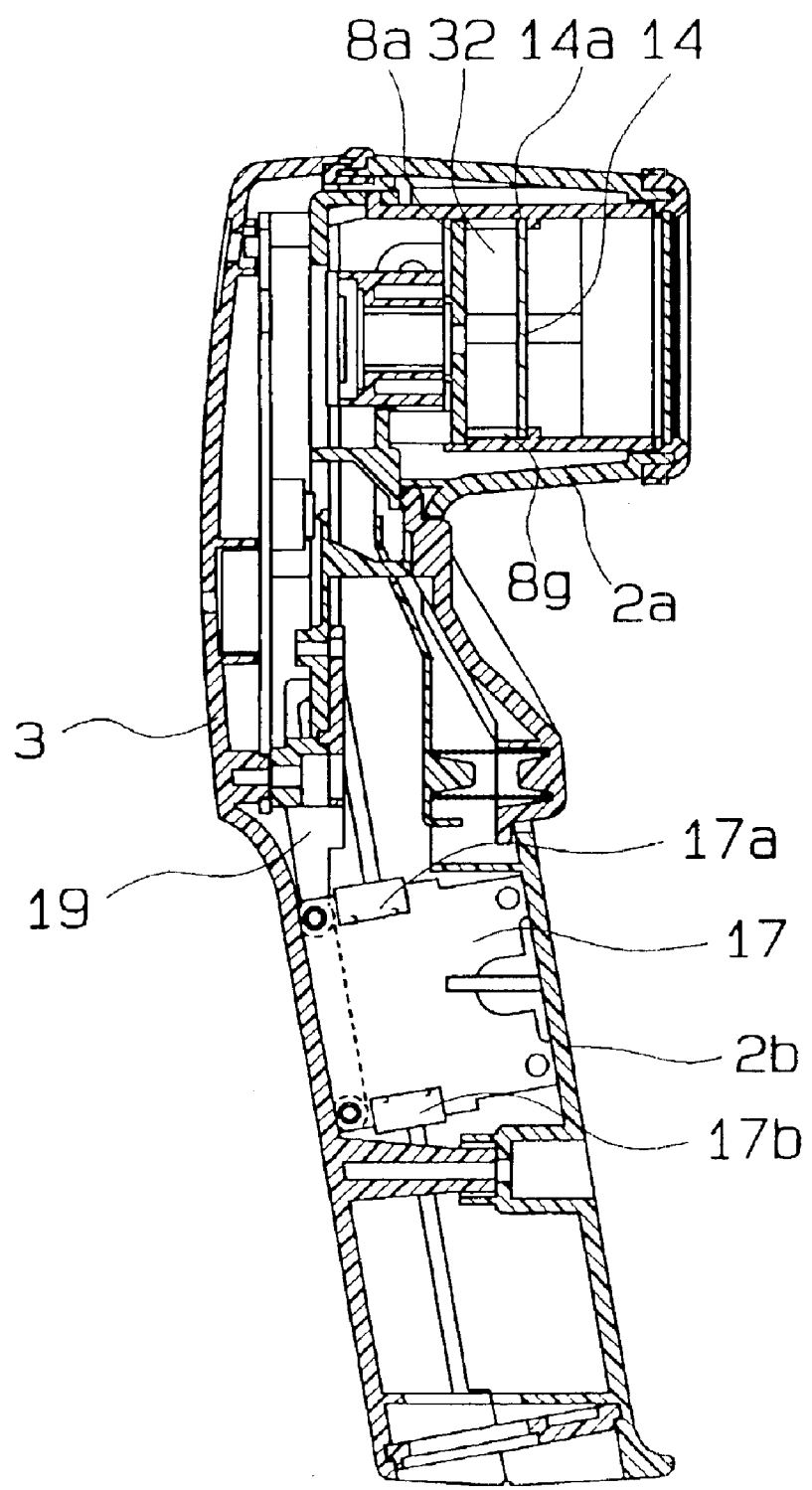
FIG. 3 is a cross-sectional view (i.e., cross-sectional view viewed from the left side) of the code reader in the y-direction shown in FIG. 1.

Referring to the non-limiting illustration of FIG. 2, the internal construction of the code reader 1 and the position of each member will be explained. As shown in FIG. 2, the hood portion 2a of the code reader 1 has an opening in the X-direction. A tip end of the hood portion 2a may be provided with a hood cover (i.e., serving as a cap) 5 including an optical filter (e.g., a transparent or semi-transparent glass or plastic or the like processed as an optical filter) for cutting the infrared ray or the ultra violet ray therein. The hood cover 5 made of, for example, rubber or elastomer or the like may have the same configuration with the opening of the hood portion 2a and may be secured to one end of the hood portion 2a.

Four position determination portions 5a for facilitating the positioning between the code 10 and a reading surface 7 in the Y-direction and the Z-direction may be formed unitarily on the hood cover 5. The position determination portion 5a has a triangular configuration, the center in the Y-direction and the Z-direction of the hood cover 5 having approximately rectangular configuration. A surface covered with the hood cover 5 corresponds to the reading surface (i.e., serving as reading side) 7 when reading the code 10. In the hood portion 2a, an illumination unit 8 may be provided in an inner part of the reading surface 7. The illumination unit 8 may correspond to an indirect illumination unit because the light may be irradiated from the reading surface 7 by reflecting the light generated in the illumination unit 8 to be reflected on an internal wall of the illumination unit 8.

The indirect illumination unit 8 may include a boxed shape having a bottom and may be made of, for example, resin or the like. The indirect illumination unit 8 may include a light transmittance member 14 therein and a darkroom 32 on the back of the light transmittance member 14 as shown in FIG. 2. The indirect illumination unit 8 may create diffused light by reflecting the red colored light generated in the indirect illumination unit 8 by the light transmittance member 14. The illumination unit 8 may further include at least one indirect illumination luminous element (i.e., serving as an indirect illumination luminous body) 18 (shown in the non-limiting illustration of FIG. 4) for creating diffused light irradiated from the reading surface 7 to the outside. The indirect illumination unit 8 may still further include the light transmittance member (e.g., a one way mirror, or a mirror (a half mirror is generally described as a mirror having 50% light transmittance, or as having a partial transmittance and a partial reflection) for transmitting particular wavelength region) 14 having a surface (i.e., serves as mirror surface) 14b having the characteristics of the mirror reflecting the light with 50% of the reflection factor on a first surface thereof on the reading surface side and a light transmittance surface 14c for transmitting 50% of the light on the second surface thereof. With the indirect illumination unit 8, the red colored light generated from the indirect illumination luminous body 18 may be reflected on the mirror surface 14b of the light transmittance member 14 formed on the reading surface side to be reflected by the mirror surface 14b on the reading surface side to be diffused. In this case, it is preferable that the color of the internal wall is white or a similarly bright color so that the diffused light may be effectively created by the internal wall of the indirect illumination unit 8.

A light restriction member 8a made from, for example, plate resin or the like and having the function of an entrance pupil may be provided on a bottom portion of the indirect illumination unit 8 in the X-direction of the indirect illumination unit 8 having the rectangular shape in cross-section for forming the diffused light. The light restriction member 8a may restrict the amount of the light being incident to a camera side via the light transmittance member 14 while closing one of the bottom portions. The light restriction member 8a and the light transmittance member 14 are arranged opposing each other in parallel. The darkroom 32 for blocking unnecessary light for reading the code is formed between the light transmittance surface 14c on the camera side of the light transmittance member 14 and the light restriction member 8a. In this case, it is preferable that the color of the internal wall of the darkroom 32 formed by the light restriction member 8a and the light transmittance member 14 in the indirect illumination unit 8 corresponds to dark color that absorbs light, such as black.

The light restriction member 8a may be formed with a lens aperture 8b having the function of the entrance pupil for imaging the image based on the reflective light on a CCD element of the CCD camera 95 facing the CCD camera 95 provided in the center on the back surface side of the light restriction member 8a. The light restriction member 8a may also be formed with two rectangular slit bores 8c for letting through the light from an aimer (i.e., serving as a marker luminous body) 94 for displaying a marker indicating the reading position relative to the code 10. The slit bores 8c may be formed sandwiching the lens aperture 8b in the Z-direction. Although the aimer 94 and the indirect illumination luminous element 18 are described as having a red color according to the first embodiment of the code reader, the color is not limited and other colors may be applied.

An optical unit 9 provided with the lenses (i.e., light axes of the plural lenses are identical) 91 having a plurality of lenses is provided on the back surface of the light restriction member 8a. The plurality of lenses include both a concave and a convex configuration, and the convex configuration may be located in the center of the lenses. The optical unit 9 may be fixed to the back surface of the light restriction member 8a of the indirect illumination unit 8 with tightening members, such as screws. The optical unit 9 may be made of resin or the like and may have a rectangular shape. As shown in the non-limiting illustration of FIG. 6, the optical unit 9 may be formed with a lens aperture 92 in the center, and aimer inserting bores 93 provided with two aimers 94 may be formed on both sides of the lens aperture 92 in the X-direction. The lens group 91 having the plural lenses may be provided in the lens aperture 92 in the center of the optical unit 9. A body portion of the aimer 94 for generating the light is inserted into the aimer inserting bores 93. In this case, the lens group 91 may be arranged corresponding the light axis with the CCD camera 95.

Figure 4:
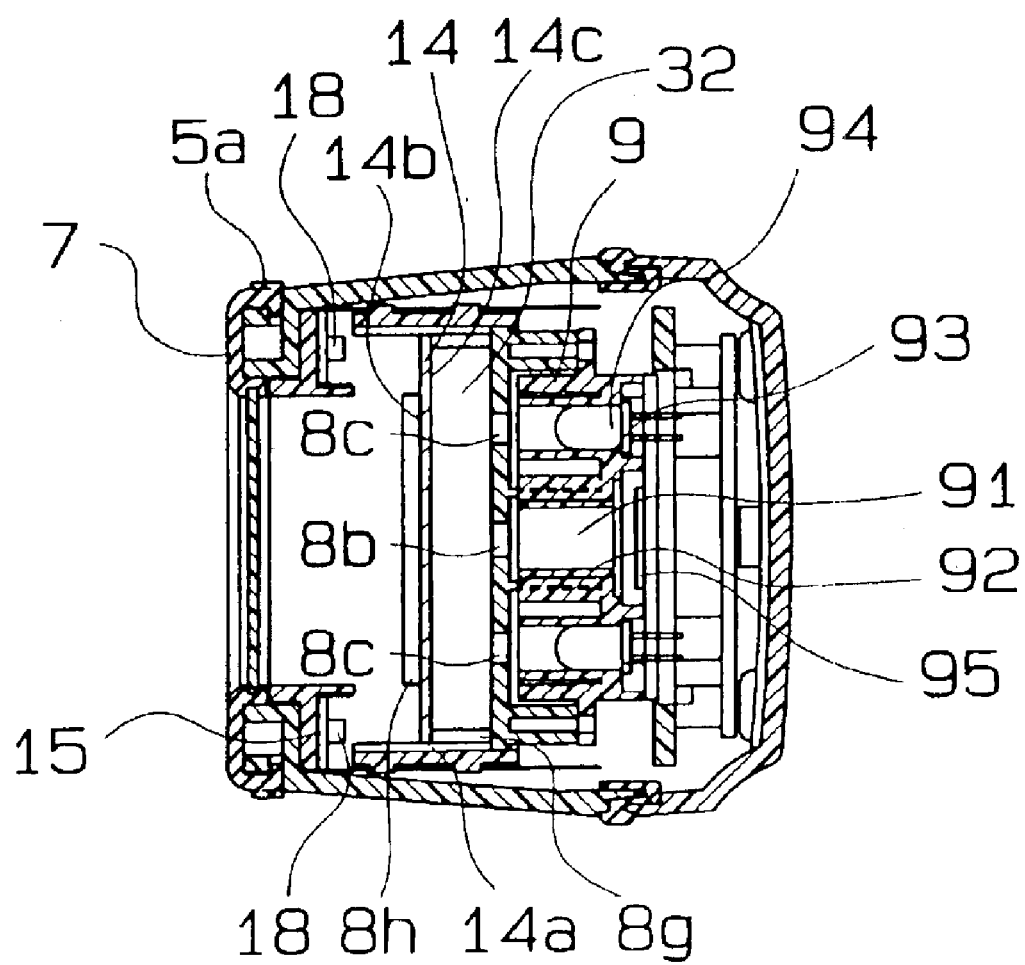
FIG. 4 is a cross-sectional view of a hood portion in the x-direction shown in FIG. 1.

The back surface of the optical unit 9 may have a concave configuration as shown in FIG. 4. The CCD camera 95 having a CCD element may be provided in the concave portion. An optical board 11 mounted with the CCD camera 95 on the surface may be fixed to the optical unit 9 with tightening members, such as screws or the like, (not shown) from the back surface of the optical board 11 as shown in FIG. 2. Terminals of the aimers 94 for generating the light for indicating the reading position when reading the code from two positions may be attached by soldering or other similar means to the optical board 11.

The optical board 11 may be mounted with the electronic parts such as a chip shaped transistor, resistors, and a condenser for constructing a drive circuit and detection circuit of the CCD camera 95 and a driver circuit for driving the aimers 94. The optical board 11 illuminates the aimer 94 and outputs a detection signal regarding the code reading from the image imaged on the CCD element by driving the CCD camera 95. The optical board 11 may be connected with a harness configured to be electrically connected with a main board 21. The detection signal related to the code read from the optical board 11 is transmitted to the main board 21, and the signal from the main board 21 drives the aimers 94 and the CCD camera 95.

Figure 5:
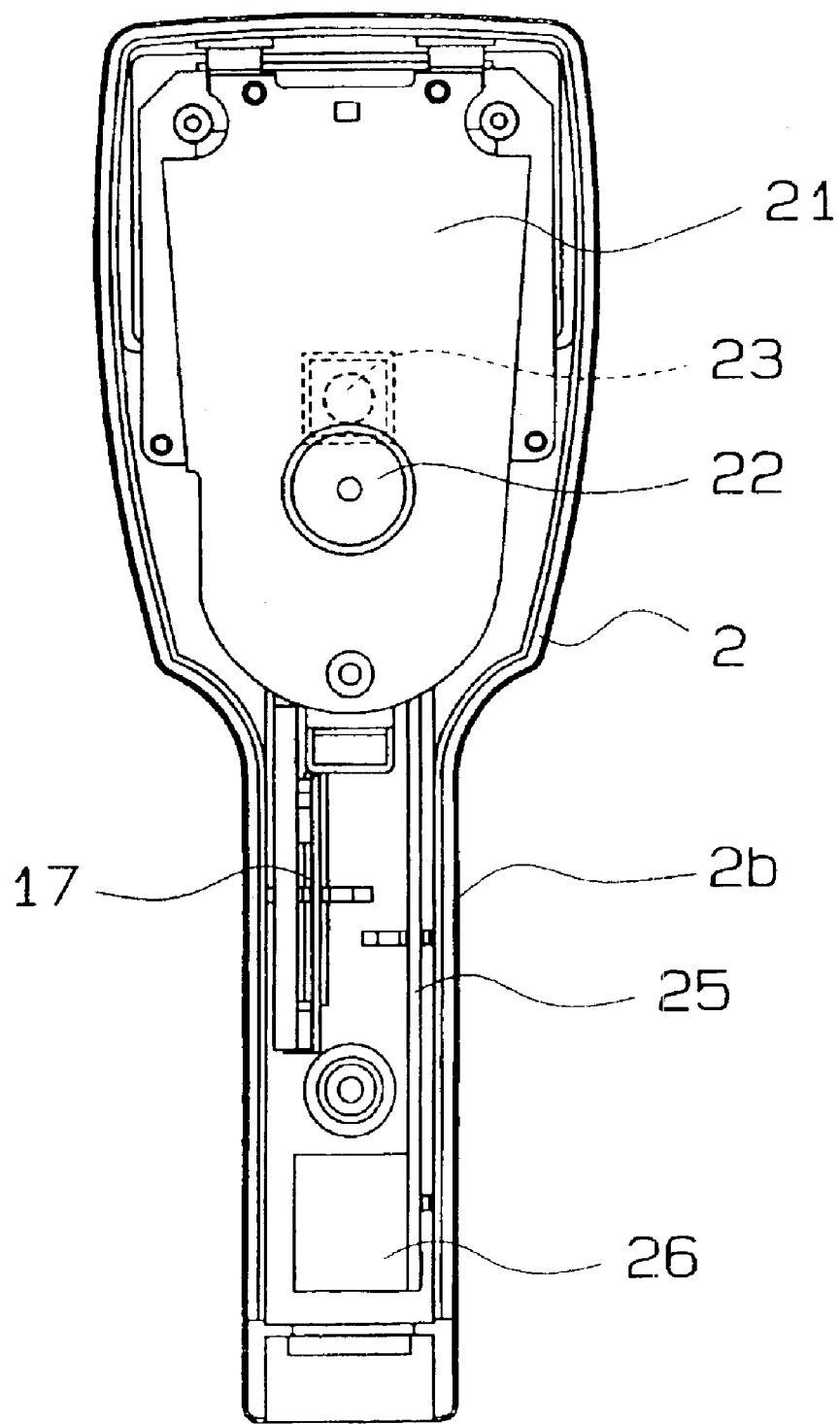
FIG. 5 is an arrangement view showing an internal construction of the code reader removed with a back housing shown in FIG. 1.
Figure 6:
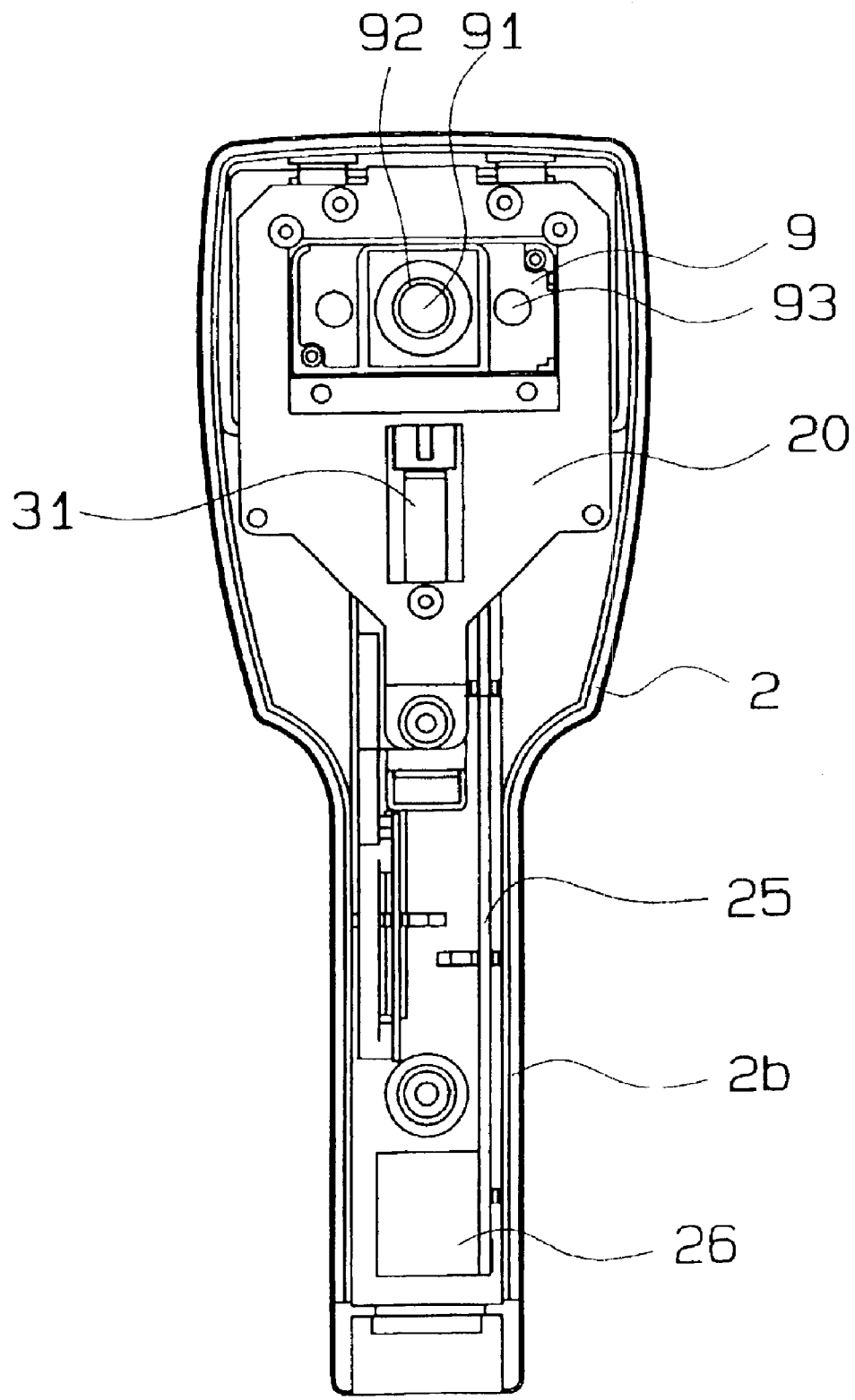
FIG. 6 is an arrangement view showing an internal construction removed with a main board and an optical board from the view shown in FIG. 5.

The main board 21 may be provided on the backmost surface of the first housing 2 as shown, for example, in FIG. 2. The main board 21 may control the code reading of the code reader 1. As shown in FIGS. 2 and 5, voltage buzzer 22 may be configured to indicate acoustically the completion of the code reading of the code 10 and a luminous body 24 configured to confirm the reading may be represented as a green LED for visually showing the completion of the code reading. The luminous body 24 may be affixed to the back side surface of the main board 21 by soldering or the like. A bore for observing the light when the code reading is properly performed and when the luminance body 24 for the confirmation may be illuminated and for passing the buzzer sounds to the outside may be formed on a portion of the second housing 3 on which the voltage buzzer 22 and the luminance body 24 for the confirmation may be provided.

Additionally, a contact switch 23 may be affixed, e.g., by soldering on a back surface of the surface where the voltage buzzer 22 and the luminance body 24 are provided on the main board 21. The main board 21 may include chip shaped electronic parts such as the transistors, resistors, and condensers on both surfaces thereof and may include a decode circuit for decoding a detection signal by the CCD element from the optical board 11, a drive circuit for driving the voltage buzzer 22, and a drive circuit for driving the luminance body 24 for confirming the reading.

Further, a central processing unit (CPU) (not shown) for controlling the code reading of the code reader 1 and a memory (not shown) for storing information regarding the code reading may be mounted on the surface of the main board 21 on the optical board side. The main board 21 may be electrically connected to the opposingly arranged optical board 11 via, e.g., a flat cable. In the main board 21, the code 10 read by the CCD camera 95 may be decoded by a decode circuit (not shown) therein. The decoded signal may be transmitted to an interface board 25 provided in the grip portion 2b shown in FIG. 2.

The signal for driving the indirect illumination luminance body 18 provided in the indirect illumination unit 8 may be driven by an indirect illumination luminance drive board 17 provided on the grip portion 2b. In this case, the indirect illumination luminance drive board 17 is driven by the direction from the main board 21.

Figure 8:
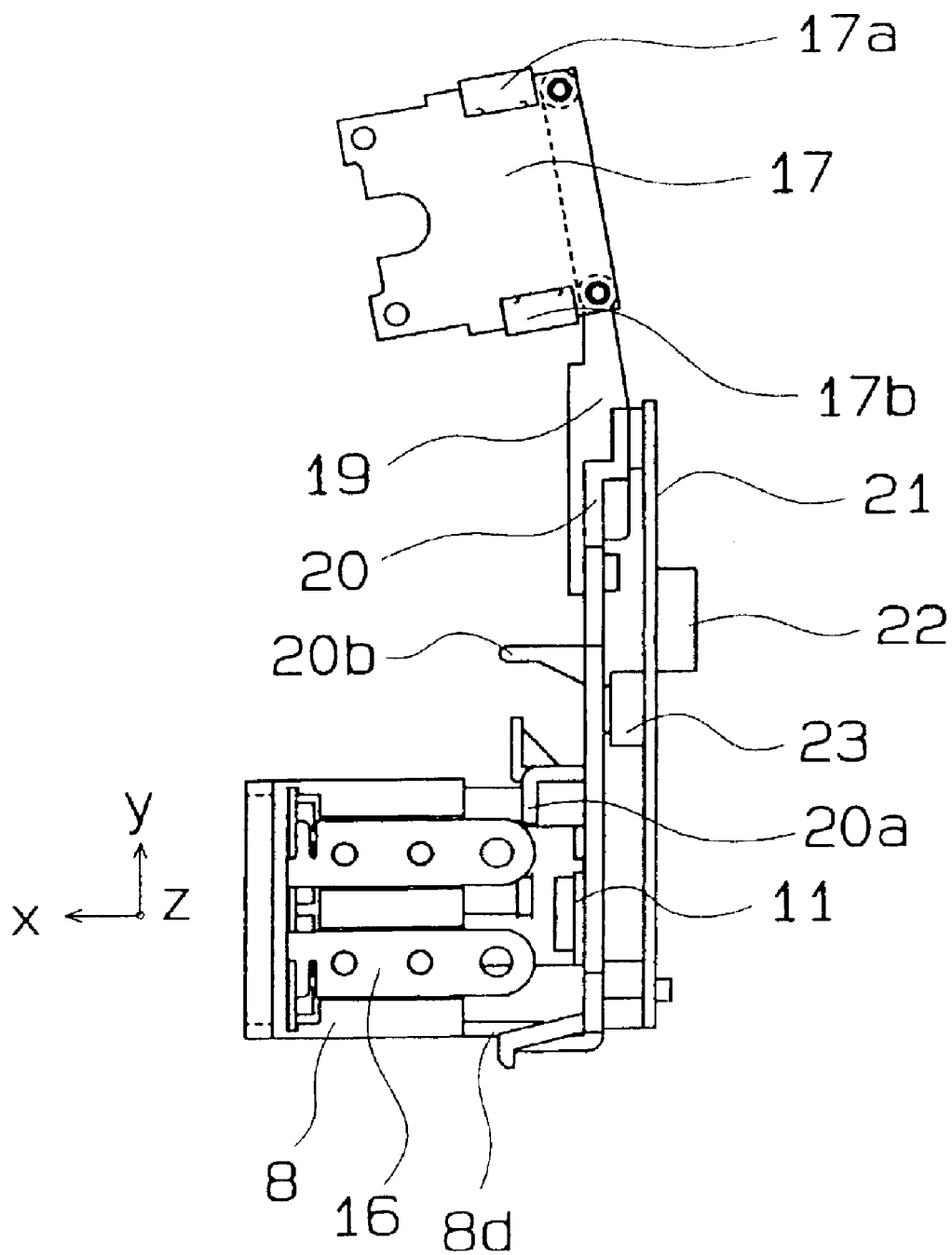
FIG. 8 is a lateral view showing the construction of the illumination unit positioned in the code reader shown in FIG. 1.

The main board 21, the optical board 11, the optical unit 9, and the indirect illumination unit 8 are formed as one unit by, for example, a resin-made holder 20 as shown in the non-limiting illustration of FIG. 8. The holder 20 may be provided being positioned at a predetermined position of the first housing 2 from the back surface of the first housing 2 to be fixed to the first housing 2 via four tightening members, such as screws or the like. The holder 20 may be extended in the Y-direction. A rectangular detent bore may be unitarily formed on the holder 20 on an end portion of the holder 20 corresponding to the top of the reader (i.e., bottom side in FIG. 8). An L-shaped craw portion 8d (shown in the exemplary depiction of FIG. 9) formed on the top of the reader of the indirect illumination unit 8 may be detained in the detent bore. The position of the indirect illumination unit 8 may be determined at a predetermined position of the holder 20. In order to contact the back surface of the indirect illumination unit 8 to the holder 20 to fix thereon, an L-shaped mounting portion 20a for fixing the indirect illumination unit 8 may be unitarily formed on the holder 20 on an end portion thereof, opposite to the craw portion 8d on an indirect illumination unit top end. The tightening members, e.g., screws, may be applied to the mounting portion 20a from the back surface side of the holder 20 to fix the indirect illumination unit 8 on the holder 20 on the reader topside.

One end of a holder 19 may be fixed to an end portion of the bottom side (i.e., top of FIG. 8) of the holder 20 via two tightening members such as screws. The drive board 17 for driving the aimer 94 having the driver circuit that may be mounted with the electronic parts such as the resistors and the transistors on the surface and for driving the indirect illumination luminance 18 may be fixed with two tightening members, such as screws in the Y-direction as shown in FIG. 8. The unit formed in the foregoing manner is provided in the hood portion 2a and the internal space formed in the grip portion 2b of the code reader 1 as shown in the non-limiting illustration of FIG. 3 to be fixed relative to the first housing 2 via the tightening members such as screw on an X-Y surface.

The drive board 17 for driving the indirect illumination luminance 18 may include two connectors 17a, 17b on both ends thereof in the Y-direction. The connector 17a may include connected to an outer connector being connected to the main board 21 via a harness (not shown). Thus, the drive signal for driving the indirect illumination luminance 18 may be output from the main board 21 for lightening the indirect illumination luminance 18 or flashing the indirect illumination luminance 18, if necessary, based on the output drive signal for performing the operation of the code reading.

Figure 7:
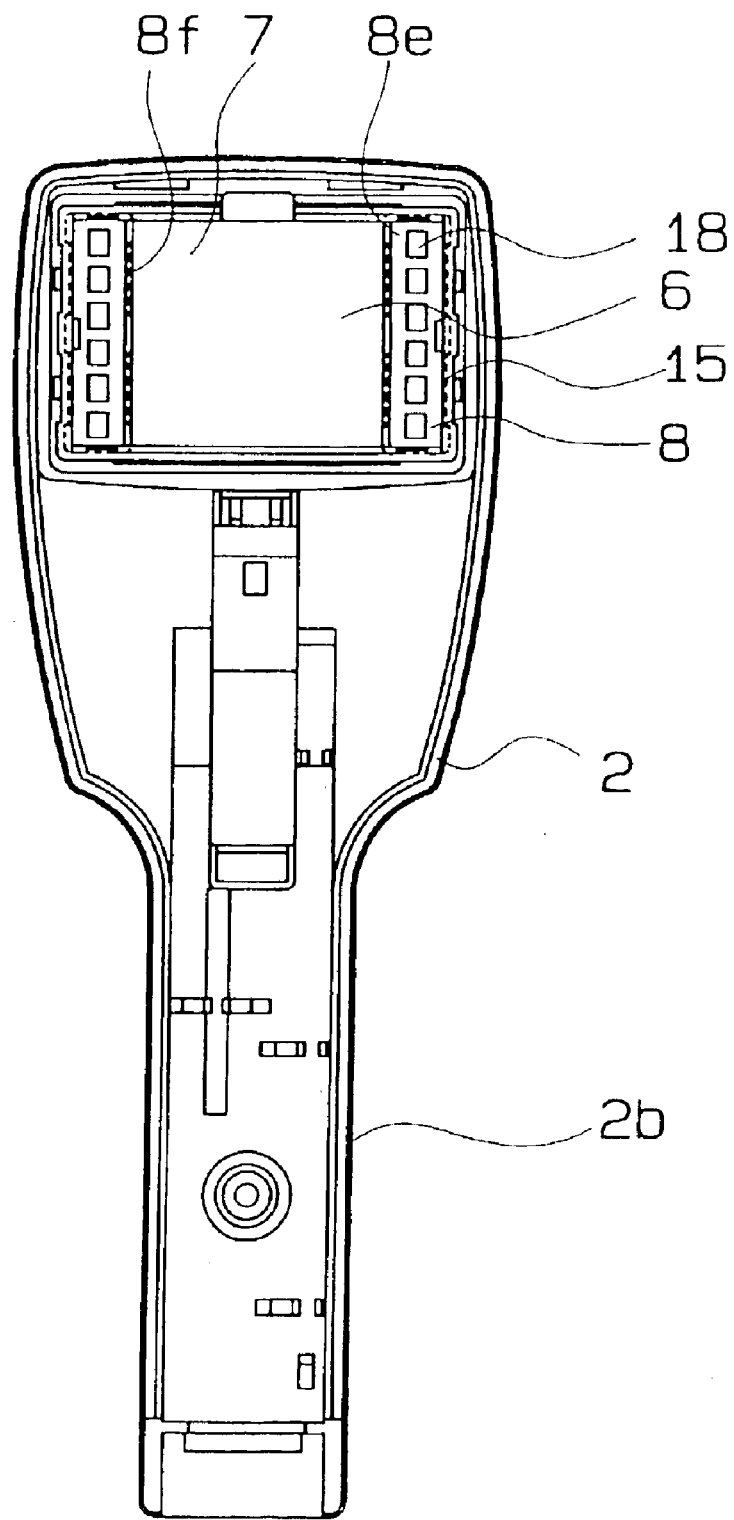
FIG. 7 is an arrangement view of an illuminant for indirect illumination viewing an illumination unit from backside relative to a housing of the code reader shown in FIG. 1.
Figure 9:
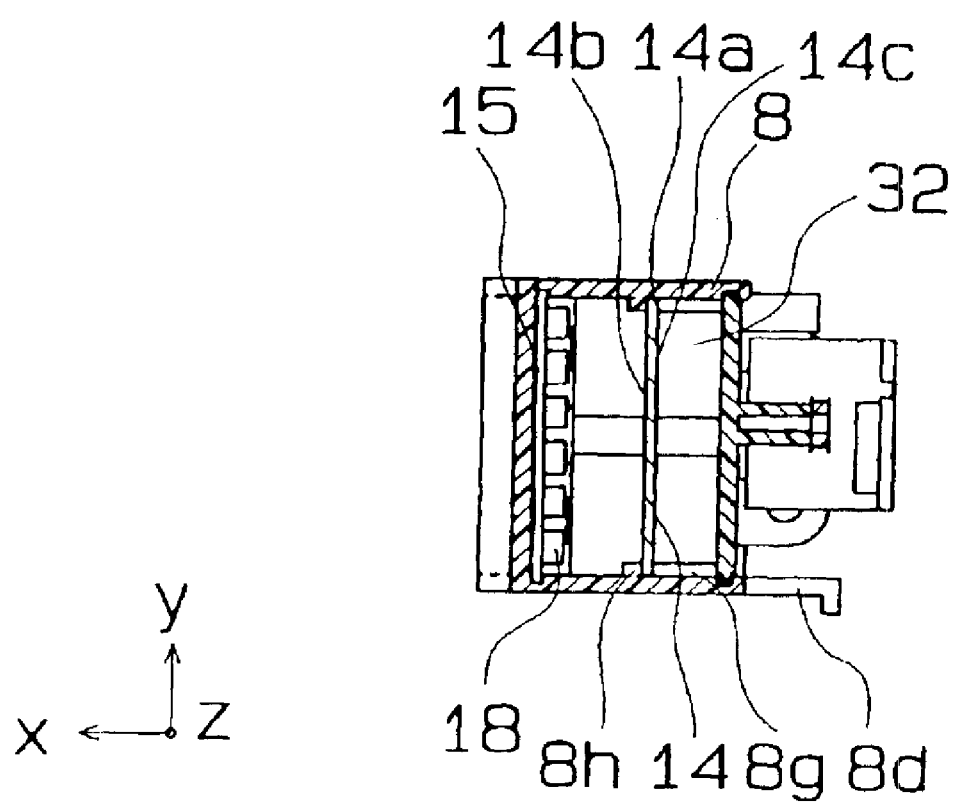
FIG. 9 is a cross-sectional view in the y-direction showing the internal construction of the illumination unit shown in FIG. 8.

Referring to FIGS. 7 and 9, the internal construction of the indirect illumination unit 8 for generating the diffused light will be explained in detail. As shown in the non-limiting illustration of FIG. 7, the indirect illumination unit 8 may include a rectangular concave portion 8e opening to the light transmittance member 14 formed on both the right and left ends and the back surface side of the reading surface 7 in the Z-direction of the reading surface 7 for reading the code 1. Indirect illumination luminance boards 15 may be provided with the plural indirect illumination luminance 18 (e.g., six LEDs on respective sides; LEDs irradiating red colored light are arranged in series) and may be arranged in the concave portion 8e.

More specifically, the indirect illumination luminance boards 15 disposed with the plural indirect illumination luminance 18 may be inserted into the concave portion 8e from board inserting openings (not shown) formed on the both ends of the indirect illumination unit 8 in the Z-direction to be fixed. The indirect illumination luminance boards 15 may be arranged in the foregoing manner so that the plural indirect illumination luminance 18 may be arranged facing the CCD camera provided on the opposite side relative to the reading surface 7 for irradiating the light to the mirror surface 14b of the light transmittance member 14.

In this case, the indirect illumination luminance 18 that may be provided on both the right and left sides of the reading surface 7 is not limited to the LED, as long as irradiating light may be reflected at the mirror surface 14b formed on the light transmittance member 14. For example, the indirect illumination luminance 18 may correspond to a plane luminance for irradiating the light evenly or a fluorescent tube with the specific color.

A half mirror may be applied as the light transmittance member 14 for reflecting the light from the indirect illumination luminance 18. The half mirror has specular characteristics with a predetermined reflection factor when the light transmittance member 14 is arranged perpendicular to the light axis X. A one way mirror, which is one kind of the half mirror, may be applied as the light transmittance member 14. The light transmittance member 14 is formed, for example, by a reflection coat with vapor deposition of chrome, silver, aluminum, or the like on a surface of transparent or semitransparent plate member made of, for example, glass, plastic, silicon, or the like, for transmitting the light. The light transmittance member 14 may have a mirror surface 14b having specular characteristics (i.e., reflection factor of 50%) for reflecting the light contacting the light transmittance member 14 on the reading surface side by coating chrome, silver, aluminum, or the like on the surface of the light transmittance member 14. On the other hand, the light transmittance member 14 may include light transmittance surface 14c having light transmittance (e.g., 40–60%, more preferably 50%) on the other side of the light transmittance member 14 on the camera side.

Both end portions 14a of the light transmittance member 14 corresponding to a configuration of the internal wall of the indirect illumination unit 8 may be inserted into position determination portions 8h (shown in FIG. 4) formed in the indirect illumination unit 8 from the back surface side of the indirect illumination unit 8 to be positioned at a predetermined position. In this case, the light transmittance surface 14c of the light transmittance member 14 is guided by two guide portions 8g extended in parallel each other and unitarily formed on the light restriction member 8a. The light transmittance member 14 may be fixed in the indirect illumination unit 8 while being supported by the position determination portions 8h and the tip ends of the guide portions 8g provided in the Z-direction.

In the foregoing manner, the light transmittance member 14 opposes the reading surface 7 while supported by the position determination portion 8h and the guide portion 8g. In this case, the light transmittance member 14 may be fixed in the indirect illumination unit 8 by providing slits for inserting the light transmittance member 14 on one side surface of the indirect illumination unit 8 having the rectangular shape as shown in FIG. 4 even if the light transmittance member 14 is not supported by the position determination portions 8h and the tip ends of the guide portions 8g.

It is preferable that the length of internal side walls 8f in the concave portions 8e provided on the right and left sides of the indirect illumination unit 8 (shown in FIG. 7) is between about one-third to about one-fourth of the length of the indirect illumination unit 8 in the X-direction, in order to produce the even diffused light in the indirect illumination unit 8. A pair of nail portions for securing the indirect illumination luminance board 15 are formed on an outer sidewall of the concave portion 8e of the indirect illumination unit 8. Electrically conductive terminals 16 (shown in FIG. 8) are electrically connected to the indirect illumination luminance 18. The terminals 16 may be provided along the side surface of the indirect illumination unit 8 in the Z-direction. The terminals 16 may be electrically connected to the connector 17b of the indirect illumination luminance drive board 17 via a harness (not shown). Thus, by providing the drive signal from the main board 21, the indirect illumination luminance 18 may be lighted or flashed for a predetermined period of time, if necessary, when reading the code.

A switch operation portion 20b may be projected in the X-direction on the middle portion of the holder 20 extended in the Y-direction. The switch operation portion 20b may be unitarily formed with the holder 20 while being movable in the X-direction. When the indirect illumination unit 8 is unitarily provided (i.e., under subassembly state), the switch operation portion 20b may be projected in the X-direction perpendicularly from the holder 20 as shown in FIG. 8.

With the foregoing construction, the contact switch 23 may be pushed by the back surface of the switch operation portion 20b when the switch operation portion 20b is operated, and thus the turning on and the turning off of the contact switch 23 is performed. In this case, the code 10 may be read by the code reader 1 when the contact switch 23 is ON and the reading of the code 10 is prohibited when the contact switch 23 is OFF.

When the user grabs the grip portion 2b, the operation lever 31 may be operated using a finger. The operation lever 31 may be pushed to rotate in the counterclockwise direction of FIG. 2 about the fulcrum 31b positioned around a base of the grip portion 2b and the hood portion 2a. In order to restrict the rotational range, with the fulcrum 31b of the operation lever 31 as the center, a concave portion 2c having a surface extended in the Y-direction may be formed on a portion of the housing 2 opposing to the back surface of the operation lever 31. A projection 2d projecting in the X-direction may be unitarily formed on a portion of the concave portion 2c of the housing 2.

On the other hand, a concave portion 31a for detaining one end of a spring 13 may be formed on a back surface corresponding to the projection 2d of the operation lever 31. The spring 13 may be provided between the concave portion 31a formed on the operation lever 31 and the projection 2d formed on the housing 2. A flange 31c extended in the Y-direction may be unitarily formed on the operation lever 31 on an end portion opposite to the fulcrum 31b of the operation lever 31. The flange 31c may extend along the configuration of the grip portion 2b from the grip portion 2b of the housing 2. The rotation of the operation lever 31 may be restricted by a restriction portion 2f covering a portion of the concave portion 2c of the housing 2. Thus, the operation lever 31 may be rotated until the back surface of the operation lever 31 contacts an apex of the projection 2d when the operation lever 31 is rotated in the counterclockwise direction shown in FIG. 2 about the fulcrum 31b against the biasing force of the spring 13.

On the other hand, the switch contact portion 20b may contact the back surface around the fulcrum of the operation lever 31. Thus, when the operation lever 31 is operated to rotate the operation lever 31 in the counterclockwise direction, the switch operation portion 20b is pushed.

Accordingly, the contact switch 23 is turned on and the switch signal from the contact switch 23 is input into the CPU of the main board 21.

When force is not applied to the operation lever 31 after operation thereof, the operation lever 31 is rotated in the clockwise direction of FIG. 2 about the fulcrum 31*b* by the biasing force of the spring 13. Thereafter, the flange 31*c* formed on one end of the operation lever 31 may contact the restriction portion 2*f* of the housing 2 to restrict the further rotation of the operation lever 31 in the clockwise direction. Thus, the operation lever 31 is returned to a non-operated state as shown in FIG. 2.

As explained above, when the rotation of the operation lever 31 in the counterclockwise direction is canceled, the pressure to the contact switch 23 by the switch operation portion 20*b* is canceled, the contact switch 23 is turned off, and the switch signal indicating the OFF state of the contact switch is input into the CPU.

The connection between the code reader 1 and an external device 40 will be explained as follows. As shown in the non-limiting illustration of FIG. 5, the interface board (i.e., I/F board) 25 may be fitted into a slit formed on a back surface of the housing 2 to be mounted opposing the drive board 17, while keeping a predetermined distance relative to the drive board 17 in the grip portion 2*b* of the code reader 1. The interface board 25 may be electrically connected to the main board 21 via a cable (e.g., a flat cable, a harness or the like, not shown). A connector 26 may be fixed to an end of the I/F board 25 on the bottom portion of the reader. The I/F board 25 also includes a power source circuit for supplying a constant direct current (e.g., 5V) relative to the plural boards of the code reader 1 therein. A circuit on the I/F board 25 supplies a stable predetermined power (e.g., 5V) to the main board 21. In case the external connector is connected to the connector 26, the data of the signal (e.g., decoded signal of the code 10 detected by the CCD camera 95) regarding the reading of the code 10 may be sent to and received by the external device (e.g., code control device having the display function or the code analysis device) 40 connected via the connector 26. In this case, the external device 40 may send the information concerning the luminance cycle of the indirect illumination luminance 18 and the aimer 94, the illumination pattern, and the luminance strength to the code reader 1, and the code reader 1 may illuminate the aimer 94 and the indirect illumination luminance 18 based on the received information.

Figure 10:
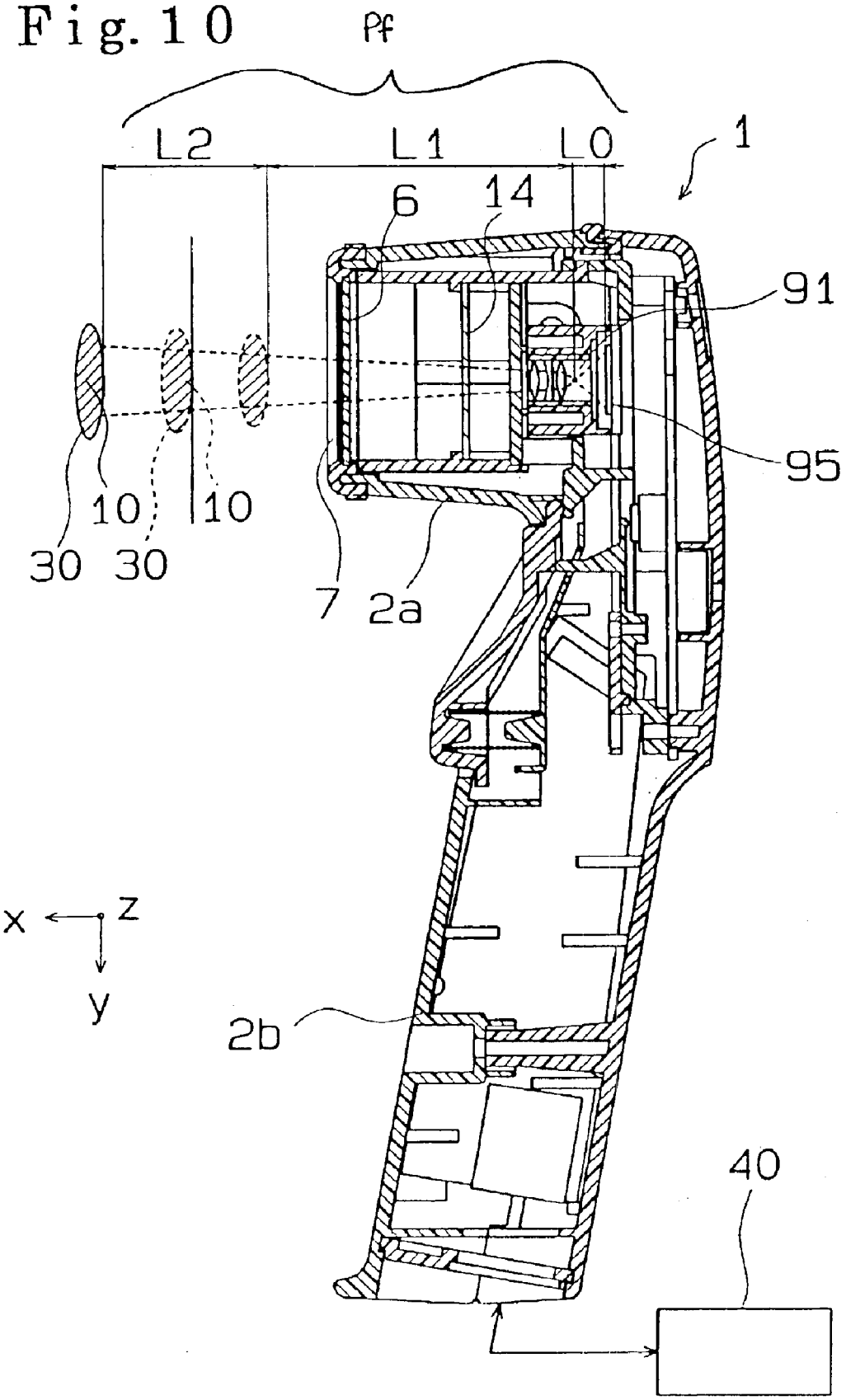
FIG. 10 is an explanatory view showing a readable region when reading a code by the code reader shown in FIG. 1.
Figure 11:
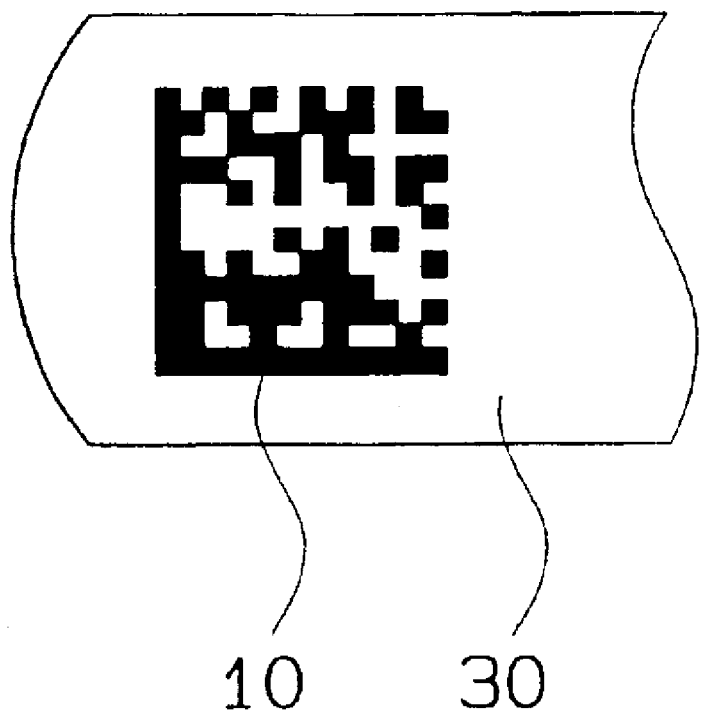
FIG. 11 is an explanatory view showing a configuration of a unique code provided on an object in FIG. 10.

The operation of the code reader 1 will be explained with reference to the non-limiting illustration of FIG. 10. The code reader 1 according to an embodiment is configured to read the code 10 provided on the object 30 by facing the hood portion 2*a* to the code 10. In this case, as shown in the non-limiting exemplary depiction of FIG. 11, a two-dimensional code 10 having a square configuration for showing the unique information of the object 30 is supplied on the object 30. Although a data matrix code is applied in the embodiments, the code is not limited and include such codes as Vericode (a two-dimensional code made by Veritech) and QR codes (a code made by Denso Company) and the like.

The user may grab the grip portion 2*b* of the code reader 1 and face the hood portion 2*a* of the code reader 1 relative to the code 10. By operating the operation lever 31 against the biasing force of the spring 13, the operation lever 31 may rotate about the fulcrum 31*b* in the counterclockwise direction of FIG. 2. By this operation, the switch operation portion 20*b* may be pushed by the back surface of the operation lever 31. Accordingly, the switch operation portion 20*b* may move in the X-direction, the contact switch 23 provided on the back surface of the switch operation portion 20*b* is pushed by the movement of the switch operation portion 20*b* to be ON state. When the contact switch 23 is ON, the signal indicating the ON state of the contact switch 23 may be recognized as a trigger for starting the reading by the CPU (not shown) in the main board 21. The information indicated by the code 10 may be read in the foregoing manner.

Under the state that the contact switch 23 is ON, the main board 21 is configured to simultaneously output the drive signal for driving the indirect illumination luminance 18 and the aimer 94 in the indirect unit to the indirect illumination luminance drive board 17 and the optical board 11. With this drive signal, a pair of the indirect illumination luminance 18 provided on the right and left sides of the opening of the indirect illumination unit 8 may be simultaneously lighted or flashed, if desired. Thereafter, the light irradiated from the indirect illumination luminance 18 reflects on the mirror surface 14*b* on the reading side of the light transmittance member 14 provided in the indirect illumination unit. Thus, the evenly diffused light by the diffusion of the predetermined amount of the light is produced between the light transmittance member 14 and the reading surface 7 to irradiate the diffused light from the read surface 7. Thus, the code 10 and the surrounding thereof may be lighted for capturing the reflection light contacting the surface of the code 10 by the CCD element of the CCD camera 95. Accordingly, a broad light for lighting the entire indirect illumination unit may be produced.

In this case, the main board 21 is configured to simultaneously drive the aimer 94 that may be provided on both sides of the CCD camera 95. The red light generated from the aimer 94 may be irradiated to the code 10 provided on the object 30 from the reading surface 7 after passing through the narrow slit bore 8*c* formed on the light restriction member 8*a* provided on the bottom portion of the indirect illumination unit 8. By irradiating the two rectangular lights from the aimers 94, the reading position of the code 10 may be determined. The diffused light contacting the code 10 and the surroundings thereof enters the light transmittance member 14 after being reflected. Viewing from the light transmittance surface 14*c* of the light transmittance member 14, the reflection light is incident into the light transmittance member 14 with the predetermined light transmittance rate (e.g., 40%–60%; more preferably, 50%) from the light transmittance surface 14*c*. Thereafter, the reflection light passing through the light transmittance member 14 is incident to the darkroom 32 formed on the light transmittance surface side of the back surface of the light transmittance member 14. Then, the reflection light having the luminance of the reflection light reflected from the code 10 multiplied by the light transmittance rate (i.e., the percentage of light allowed to pass through the light transmittance member) of the light transmittance member 14 is incident to the lens aperture 8*b* formed in the center of the light restriction member 8*a* having the function of entrance pupil. The light incident into the lens aperture 8*b* is imaged on the CCD element of the CCD camera 95 via the lens group 91 provided on the back surface of the light restriction member 8*a* and the image by the reflection wave is detected by the CCD element.

In this case, the reflection light contacting the code 10 on the object is incident into the CCD element via the light transmittance member 14, the darkroom 32, and the lens group 91 because the darkroom 32 is positioned between the light transmittance member 14 and the light restriction member 8a in the indirect illumination unit 8.

With the foregoing process, the signal detected by the CCD element of the light transmittance surface 14c and the CCD element of the CCD camera 95 may be transmitted to the main board 21, the detection signal is decoded by the decode circuit in the main board 21, and the decoded signal is transmitted to the I/F circuit. Thereafter, the decoded signal may be transmitted to the external device 40 from the connector 26 provided on the I/F circuit 25. With the external device 40, total management of the plural objects 30 may be preformed by displaying the code 10 read by the code reader 1 on the display of the external device 40 and by analyzing the information shown by the code 10.

Next, code reading will be explained with reference to FIG. 10. According to this embodiment, the optical board 11 may be assembled on the back surface of the optical unit 9 and the CCD camera 95 may be fixed on the optical board 11. With the non-limiting illustration shown in FIG. 10, the CCD camera 95 and the light axis X of the lens group 91 including the plural lenses therein may be coordinated. If the distance between the CCD camera 95 and a focus Pf of camera is determined to be L0 and a distance between the focus Pf of the camera and the object is determined to be L1, the object at a distance of L1 from the camera focus Pf is imaged on the CCD element of the CCD camera 95. Thus, the coder reader 1 is capable of performing the code reading of the code 10 if the distance to the object to be read (e.g., a two dimensional code) is determined to be a minimum recognition distance combined with (either by addition or subtraction) a predetermined value. In other words, the code reader 1 is capable of reading the code 10 when the relative distance between the code reader 1 and the code 10 is within a range of a recognizable region L2. In this case, an optimal focus position is determined at an intermediate position between the minimum recognition distance and the maximum recognition distance.

According to the indirect illumination unit 8 of the foregoing construction, the darkroom 32 is formed between the light transmittance member 14 located on the reading side relative to the CCD camera 95 and the light restriction member 8a, the diffused light is generated by diffusing the light generated from the indirect illumination luminance 18 by the mirror surface 14b of the light transmittance member 14, and the imaging of the reflection light reflected from the code 10 is performed via the light transmittance member 14 and the darkroom 32. Because the darkroom 32 is provided on the reading side relative to the lens for entering the reflection light from the code 10 into the lens and unnecessary light for code reading is absorbed or blocked. Accordingly, by providing the darkroom 32 as illustrated in FIG. 2, light incident from the light transmittance member 14 and the lens aperture 8b may not be reflected on the mirror surface. For example, even if the code 10 is provided on an object having a mirrored surface, reflection on the mirrored surface of the configuration of the lens aperture 8b and the two slits 8c on the code provided on the mirrored surface or on the mirrored surface itself as black dots or black mark (hereinafter referred as black dots).

Thus, the code reader 1 does not require that the reading position be adjusted relative to the code 10 to avoid black dots overlapping the code. The elimination of the adjustment of the code reader therefore improves the reading of the code 10.

In one embodiment, the light transmittance of the light transmittance member 14 may depend on the size of the darkroom 32. In other words, the larger the distance between the light restriction member 8a and the light transmittance member 14, the larger the light transmittance rate of the light transmittance member 14. To prevent formation of black dots on the code provided on a mirrored surface, the light transmittance rate is determined to be the rate that the image of the lens aperture 8b and the lens bore 8c formed on the opposite side from the mirror surface 14b do not appear when viewing the light transmittance member 14 from the reading surface 7.

According to another embodiment of the present invention, when diffused light is generated by the indirect illumination luminance 18 and the mirror surface 14b of the light transmittance member 14 for reading the code, saturation of the CCD element may be prevented. Saturation of the CCD element may be prevented because the luminance of the reflection light (when the reflection light has high luminance) is reduced by the diffused light between the reading surface 7 and the light transmittance member 14, even if the reflection light with high luminance is provided on the light transmittance member 14 by the mirror reflection. Thus, the image of the reflection wave is securely imaged on the CCD element even with the code 10 provided on the mirror surface. Accordingly, even if the code 10 is provided on an object having a mirrored surface, the reading of the code 10 may be securely performed and the reliability of the code reader 1 is improved, without deteriorating the operability of the code reader 1 during code reading.

When the code reading results in an accurate reading of the code, the user may visually and audibly recognize that the code reader 1 has accurately read the code 10 because the code reader may sound the voltage buzzer 22 and may flash the luminance body 24 for the confirmation by the main board 21. In case the luminance is insufficient for code reading, an order for increasing the luminance may be output from the external device 40 to the main broad 21 to thereby increase the intensity of the illumination of the indirect illumination luminance 18 to make the code 10 easily readable. Although the plane light transmittance member 14 is provided in the indirect illumination unit according to the first embodiment, the construction of the present invention is not limited to this construction.

Figure 12:
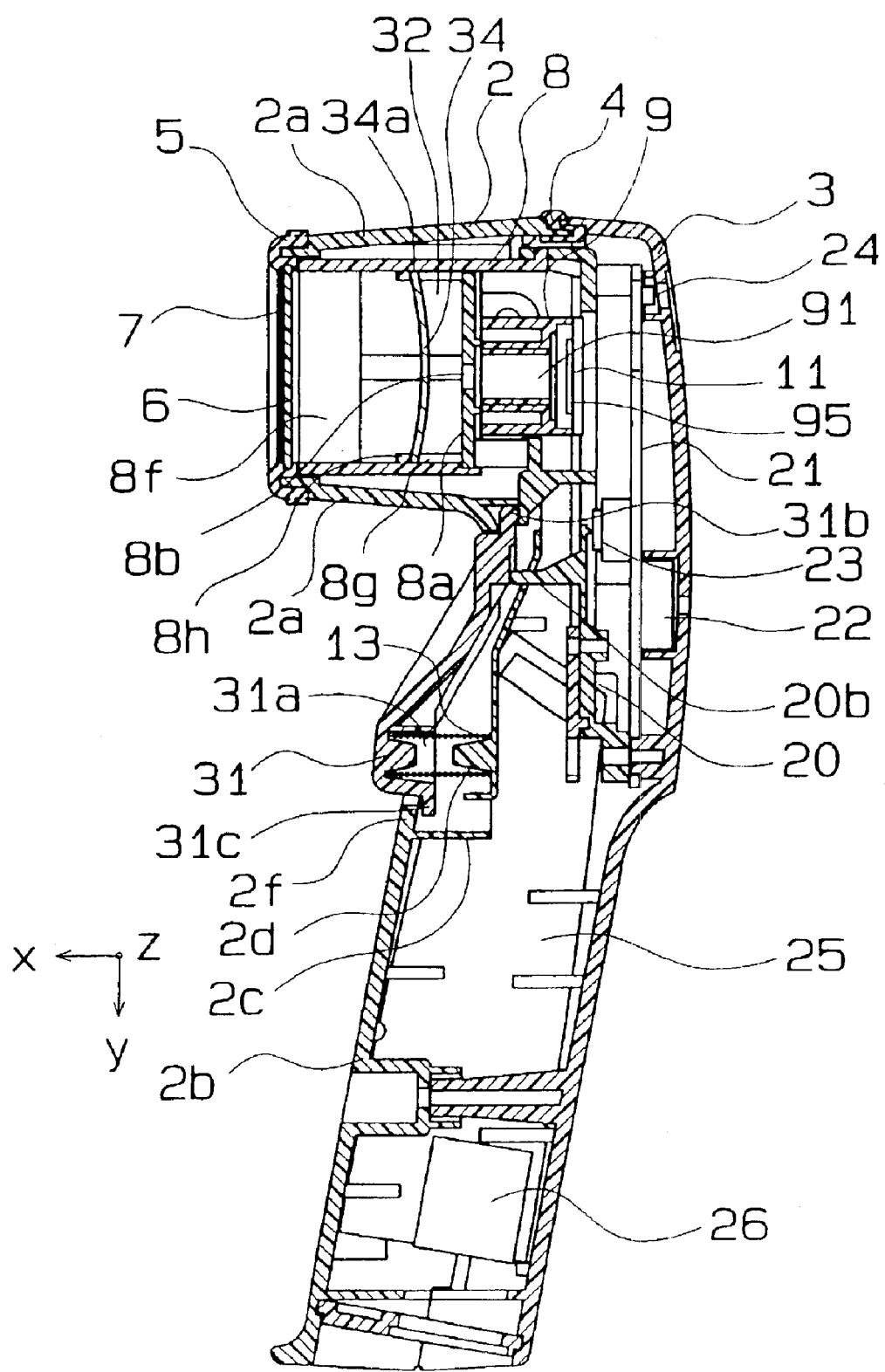
FIG. 12 is a cross-sectional view in the y-direction showing an internal construction of a code reader according to a second embodiment of the present invention.

A second embodiment of the present invention will be explained with reference to the non-limiting illustration of FIG. 12. As an alternative to the plane light transmittance member 14 according to the first embodiment, a curved light transmittance member 34 having a predetermined curvature may be provided between the indirect illumination luminance 18 and the light restriction member 8a. The light transmittance member 34 having the predetermined curvature includes a mirror surface having a predetermined reflection rate (e.g. 50%) on one surface on the reading side treated with a vapor deposition with metal such as chrome, silver, and aluminum. The other surface of the light transmittance member 34 includes a light transmittance surface (e.g., having a light transmittance rate of about 50%) similar to the first embodiment.

By applying the curved light transmittance member 34, a range being irradiated with the diffused light generated from the reading surface 7 may be narrowed to gather the light to a specific region (e.g., to the code 10 and the surrounding area thereof), thereby increasing the luminance around the surrounding region of the code 10. Accordingly, the luminance of the region to be read during the code reading operation may easily be increased, with less manufacturing cost. Thus, a luminous body having a lower output and a lower luminance may be used, because the luminance of the region to be read may be increased with the application of the curved light transmittance member 34.

In this case, the configuration of the light transmittance member 34 may be changed using a material configured to deform under a specific condition, such as piezoelectric element that may be deformed applying the electric voltage (i.e., electric current), or other similar materials known to one of ordinary skill in the art. For example, the configuration of the chosen material may be a plane shape under the state that the electric voltage is not applied to the light transmittance member 34 and the light transmittance member 34 may be deformed to be curved by the application of the electric voltage relative to the light transmittance member 34 by the external device 40 or the main board 21.

A third embodiment of the present invention will be explained with reference to the non-limiting depiction of FIG. 13. With the third embodiment, the optical characteristics between a region (camera view) 50 of the plane light transmittance member 14 or the curved transmittance member 34 through which the reflection light from the code 10 passes and the other portion of the light transmittance member 14 or 34 may be differentiated.

Figure 13:
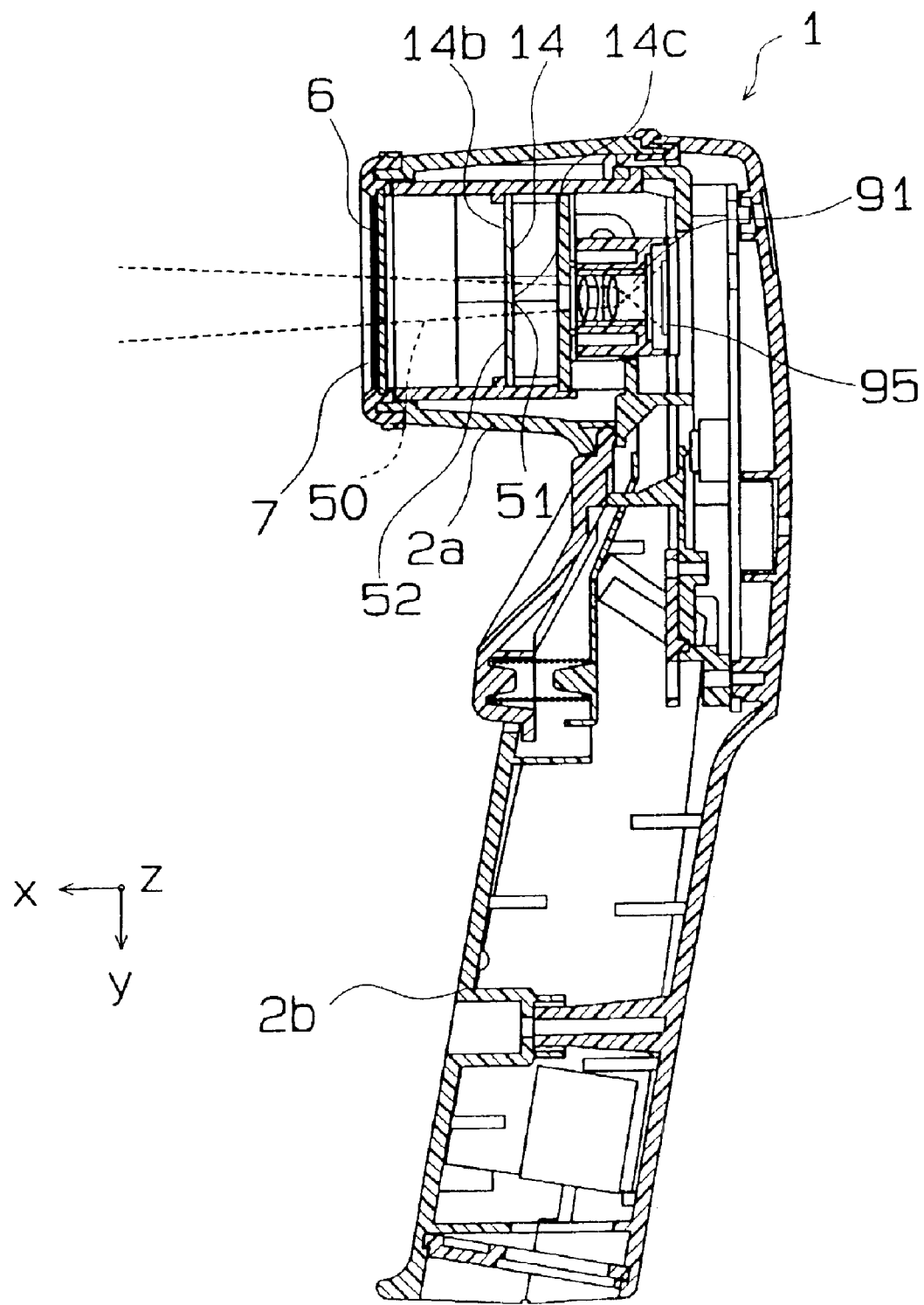
FIG. 13 is a cross-sectional view in the y-direction showing an internal construction of a code reader according to a third embodiment of the present invention.

More specifically, as shown in FIG. 13, the light transmittance member 14 includes a half mirror with a predetermined light transmittance (e.g. about 40%–60 %, preferably about 50%) on a circular or polygonal region slightly larger than the camera view 50 or in a range of the camera view 50 capable of capturing about a light axis x, which is the capturing center of the CCD camera 95. The external area of the half mirror area may include the mirror surface 14b having approximately 50% of the reflection rate, which may be formed by metallizing the reading surface side with metal such as chrome, silver, aluminum, or the like, or may be formed with a coating layer such as chrome, silver, aluminum, or the like. A plurality of transparent or semi-transparent members (e.g., half mirror, mirror, or the like) having different optical characteristics may be combined.

With the foregoing construction, when the light is generated from the indirect illumination luminance body 18 of the indirect illumination unit 8, diffused light may be generated efficiently on the mirror surface 14b of the reflection region 52. In addition, because the half mirror with 50% of the light transmittance rate may be applied in an incidence region 51 in the camera view formed in the center of the light transmittance member 14, the luminance of the reflection light contacting the code 10 may be prevented from declining during incidence into the CCD camera 95.

More specifically, provided that the light transmittance member 14 having the mirror surface 14b with the predetermined reflection rate (e.g., 0.5), as shown in the non-limiting illustration of FIG. 2 of the first embodiment, may be applied and the light may be completely reflected at the code 10, the light generated from the indirect illumination luminance body 18 (i.e., determined to have luminance 100) is reflected at the mirror surface 14b to contact the code 10 and the completely reflected reflection light is incident to the CCD camera 95 after passing through the mirror surface 14b. In this case, determining the luminance of the light generated from the indirect illumination luminance body 18 as 100, the luminance of the reflection light being incident into the CCD camera 95 may be determined to be 25 (i.e., equal to the product of (100×0.5×0.5)) in a light transmittance passage with the least light reflection.

As shown in the exemplary illustration of FIG. 13, if the light is reflected on the mirror surface (e.g., having reflection rate of 1) of the light transmittance member 14 other than the camera view of the CCD camera 95 to contact the code 10 to be completely reflected and the light is incident in the camera view via the half mirror (i.e., light transmittance rate 50%) formed in the camera view, the luminance of the reflection light incident into the CCD camera 95 is determined to be 50 (the product of (100×0.5)) with the least reflection route.

Accordingly, as shown in the non-limiting third embodiment, by varying the optical characteristics by reflecting the light at the incidence region 51 corresponding to the camera view region of the light transmittance member 14 and other region (reflection region) 52, the luminance of the reflection wave being incident into the CCD camera 95 may be increased. Because this construction may be achieved by providing the coating layer on a specific portion relative to the surface of the light transmittance member 14 with the metal such as chrome, silver, and aluminum, or the like, or by treating with a vapor deposition of a metal or the like relative to the transparent or semi-transparent plate member, the light transmittance member 14 may be manufactured with the approximately same cost as the first embodiment.

As explained relative to the first through third embodiments, because the light transmittance member 14 or 34 may be provided opposite to the reading surface 7 while keeping a predetermined distance, the length from the position of the CCD camera 95 to the reading surface 7 may be shortened by reducing the size of the hood portion 2a compared to the code reader provided with the semitransparent mirror late with the inclination (e.g., 45 degrees).

Further, even when the code reader 1 is accidentally dropped during the use or moving thereof, the strength against damage from dropping is increased compared to the known code reader because the light transmittance member 14 or 34 is provided approximately center of the hood portion 2a.

According to the embodiments of the present invention, the light generated from the means for illuminating may be reflected by the mirror surface of the light transmittance member. The diffused light may be generated with less manufacturing cost by the light transmittance member provided between the incident light restriction means and the means for illuminating.

Because the light transmittance member may be provided opposite to the reading side, the length from the capturing means to the reading side may be shortened and thus the size of the code reader itself may be reduced. Further, even in the case of accidentally dropping the code reader to the ground, the code reader has stronger construction because the light transmittance member is provided between the incident light restriction means and the means for illuminating.

Additionally, by providing the dark room between the capturing means and the means for light transmitting, even when an identical code is provided on the mirror surface, the black point of the incident hole entering the means for capturing does not reflect on the mirror surface by the positional relationship between the means for light transmitting and the darkroom. Thus, the precise code recognition may be achieved and the operability during code reading is good even when an identical code is provided on the mirror surface.

In addition, the means for illuminating may be provided between the reading side and the means for light transmitting and by irradiating the light to the mirror surface of the means for transmitting, the diffused light may be generated efficiently by reflecting the light from the means for illuminating to the mirror surface of the means for transmitting. In this case, the black point of the incident hole does not reflect on the identical code of the object having the mirror surface with the uniform diffused light.

By applying a means for light transmitting such as half mirror, the luminance of the means for light transmitting may be increased with inexpensive construction without providing a complex circuit for operating the means for illuminating in order to achieve the high luminance and the means for illuminating with high luminance.

By providing the curved configuration to the means for light transmitting, the light from the means for illuminating may be gathered effectively and thus the luminance may be increased with a simple construction.

Further, by constructing the means for light transmitting with the half mirror in the view region for capturing the identical code by the capturing means and with the mirror surface out of the view region, because the means for transmitting light is formed with the mirror surface other than the view region for capturing the identical code by the capturing means, the light may be reflected effectively outside the view region without influencing the recognition performance. Thus, the reading surface for reading the identical code may be illuminated with bright light. On the other hand, because the means for transmitting light may be formed with the half mirror in the view region for capturing the identical code by the capturing means, the luminance of the reflection light being incident is not largely declined. Thus, the code may be recognized from the brightly illuminated reading surface. Accordingly, the performance of the code recognition may be improved.

The principles, preferred embodiment and mode of operation of the present invention have been described in the foregoing specification. However, the invention intended to be protected is not to be construed as limited to the particular embodiments herein disclosed. Further, the embodiments described herein are to be regarded as illustrative, rather than restrictive. Variations and changes may be made by others, and equivalents employed, without departing from the spirit of the present invention. Accordingly, it is expressly intended that all such variations, changes, and equivalents that fall within the spirit and scope of the present invention as defined in the claims, be embraced thereby.

What is claimed is:

1. A code reader, comprising:
    a housing including a reading side for reading a code provided on an object;
    means, provided in the housing, for illuminating the code;
    means for capturing an image, provided in the housing; and
    means for transmitting light, provided between the means for capturing and the means for illuminating, and having mirror surface characteristics on a first surface thereof and a light transmittance on a second surface thereof,
    wherein the means for illuminating irradiates light from the reading side to the code for reading information contained in the code by a reflection light reflected from the code, and
    the means for transmitting is provided approximately parallel to and opposite to the reading side.

2. The code reader according to claim 1, further comprising:
    a darkroom provided between the means for capturing and the means for transmitting.

3. The code reader according to claim 2, wherein the darkroom includes an internal wall colored in black.

4. The code reader according to claim 2, wherein the means for transmitting has a light transmittance rate that blocks undesired images.

5. The code reader according to claim 1, wherein the means for illuminating is provided between the reading side and the means for transmitting for irradiating a light to a mirror surface of the means for transmitting.

6. The code reader according to claim 1, wherein the means for transmitting includes a half mirror.

7. The code reader according to claim 1, wherein the means for transmitting includes a curved configuration.

8. The code reader according to claim 1, wherein the means for transmitting includes a half mirror in a view region for capturing the code and a mirrored surface on a region other than the view region.

9. The code reader according to claim 1, wherein the means for illuminating includes an internal wall having a white surface.

10. The code reader according to claim 1, wherein the means for transmitting has a first light transmittance rate in a view region that is different from a second light transmittance rate in a region that is not the view region.

11. The code reader according to claim 1, wherein the means for transmitting is located interior of the housing.

12. A code reader, comprising:
    a housing including a reading side for reading a code provided on an object;
    means, provided in the housing, for illuminating the code;
    means for capturing an image, provided in the housing;
    means for restricting incident light entering the means for capturing; and
    means for transmitting light provided between the means for restricting incident light and the means for illuminating, wherein
    the means for illuminating irradiates a light from the reading side to the code for reading a reflection light reflected from the code via the means for restricting incident light, and
    means for transmitting is provided approximately parallel to and opposite to the reading side.

13. The code reader according to claim 12, further comprising:
    a darkroom provided between the means for capturing and the means for transmitting.

14. The code reader according to claim 12, wherein the means for illuminating is provided between the reading side and the means for transmitting for irradiating a light to a mirror surface of the means for transmitting.

15. The code reader according to claim 12, wherein the means for transmitting includes a half mirror.

16. The code reader according to claim 12, wherein the means for transmitting includes a curved configuration.

17. The code reader according to claim 12, wherein means for transmitting includes a half mirror in a view region for capturing the code and a mirrored surface on a region other than the view region.

18. The code reader according to claim 12, wherein the means for illuminating includes an internal wall having a white surface.

19. The code reader according to claim 12, wherein the means for transmitting has a first light transmittance rate in a view region that is different from a second light transmittance rate in a region that is not the view region.

20. The code reader according to claim 12, wherein the means for transmitting is located interior of the housing.

21. A code reader, comprising:
    a housing including a reading side;
    a light source positioned at the housing to illuminate the code;
    a CCD camera positioned at the housing to receive light reflected from the code, thereby capturing the code;

a light transmitting member, provided between the CCD camera and the light source at the housing, including a mirrored surface on at least a first portion thereof and a transmitting surface on at least a second portion thereof, wherein the light source is configured to irradiate light from the reading side to the code for reading information contained in the code by a reflection light reflected from the code, and the light transmitting member is provided approximately parallel to and opposite to the reading side.

* * * * *